(12) United States Patent
Dooley

(10) Patent No.: US 7,203,170 B2
(45) Date of Patent: Apr. 10, 2007

(54) NETWORK SWITCH PORT WITH WEIGHTED RANDOM EARLY DISCARD

(75) Inventor: David L. Dooley, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 654 days.

(21) Appl. No.: 09/847,076

(22) Filed: May 1, 2001

(65) Prior Publication Data

US 2002/0163914 A1 Nov. 7, 2002

(51) Int. Cl.
  *G01R 31/08* (2006.01)
  *H04L 12/28* (2006.01)
(52) U.S. Cl. .................. 370/235; 370/395.7; 370/412; 370/470
(58) Field of Classification Search ........ 370/351–353, 370/412–418, 389, 395.1, 229–235, 252–3, 370/395.7, 395.71, 395.72, 395.21, 395.52, 370/395.65, 395.5, 395.51, 395.6, 242–246, 370/253, 395.2, 470; 711/216
See application file for complete search history.

(56) References Cited

U.S. PATENT DOCUMENTS

| | | | | |
|---|---|---|---|---|
| 5,166,894 A | * | 11/1992 | Saito | ........................ 708/200 |
| 5,764,641 A | * | 6/1998 | Lin | ............................ 370/412 |
| 5,936,939 A | * | 8/1999 | Des Jardins et al. | ........ 370/229 |
| 6,222,822 B1 | * | 4/2001 | Gerardin et al. | ............ 370/230 |
| 6,529,478 B1 | * | 3/2003 | Schwartz et al. | ........... 370/236 |
| 6,560,198 B1 | * | 5/2003 | Ott et al. | ..................... 370/235 |
| 6,611,522 B1 | * | 8/2003 | Zheng et al. | ........... 370/395.21 |
| 6,721,316 B1 | * | 4/2004 | Epps et al. | .................. 370/389 |
| 6,781,994 B1 | * | 8/2004 | Nogami et al. | .......... 370/395.1 |

OTHER PUBLICATIONS

Makkar, Rupinder; Empirical Study of Buffer Management Scheme for Diffserv Assured Forwarding PHB; 2000; IEEE; pp. 632-637.*

* cited by examiner

*Primary Examiner*—Doris H. To
*Assistant Examiner*—Ian N. Moore
(74) *Attorney, Agent, or Firm*—Smith-Hill & Bedell, P.C.

(57) ABSTRACT

A network switch port receives, stores and then forwards incoming cells. The network switch assigns each incoming cell to one of a set of flow queues, each of which is allotted a portion of space in a cell memory. The switch port periodically computes a average of the number of cells assigned to each flow queue stored in the cell memory during a preceding period, and assigns a discard weight to each incoming cell that is a function of the amount by which the average for the cell's assigned flow queue exceeds a threshold level. The switch port randomly discards incoming cells assigned to the flow queue with a probability that increases with the incoming cells' assigned weights. The switch port stores incoming cells that are not randomly discarded in the cell memory and later forewords them from the cell memory.

18 Claims, 6 Drawing Sheets

Figure 1:
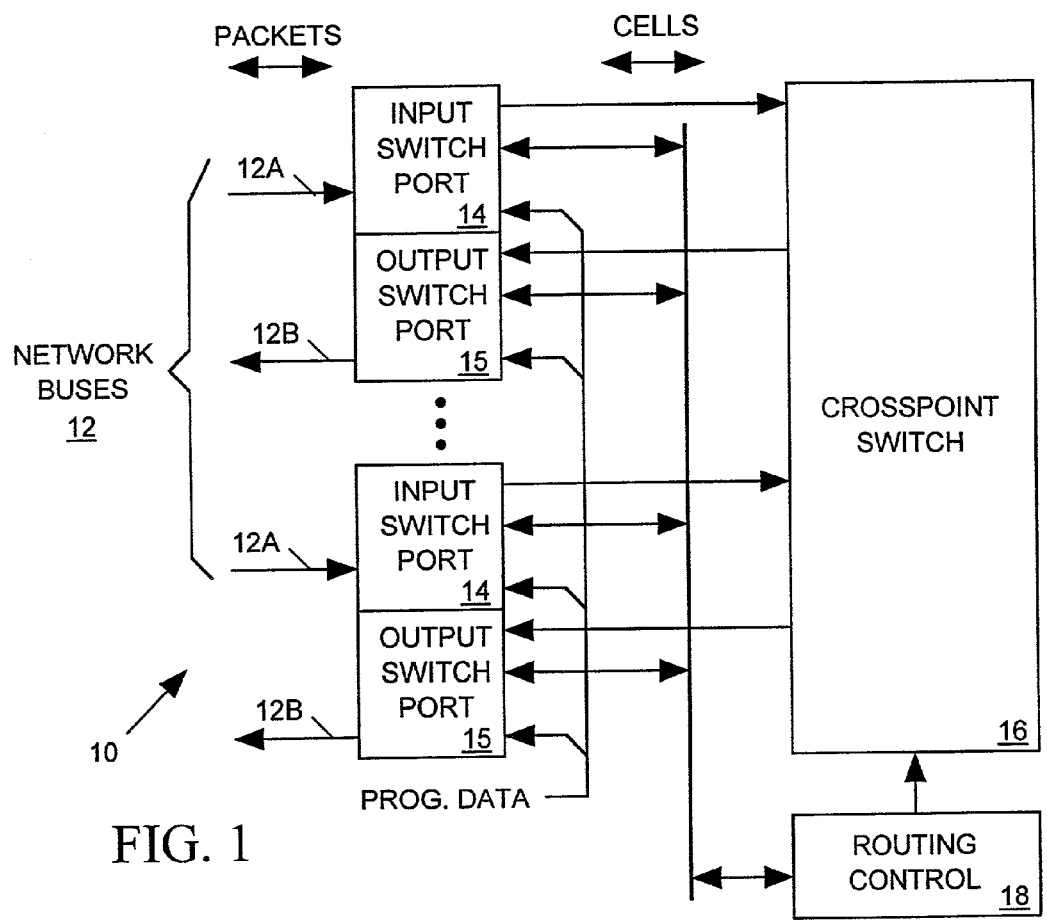

| CURRENT STATE | DATA | | | | WRED_ DISCARD | NEXT STATE |
|---|---|---|---|---|---|---|
| | SOP | EOP | TD | USER_ DATA | | |
| ACCEPT | 0 | 0 | 0 | 1 | 0 | ACCEPT |
| | 0 | 0 | 1 | 1 | 0 | ACCEPT |
| | 0 | 1 | 0 | 1 | 0 | ACCEPT |
| | 0 | 1 | 1 | 1 | 0 | ACCEPT |
| | 1 | 0 | 0 | 1 | 0 | ACCEPT |
| | 1 | 0 | 1 | 1 | 1 | FPD |
| | 1 | 1 | 0 | 1 | 0 | ACCEPT |
| | 1 | 1 | 1 | 1 | 1 | ACCEPT |
| | X | X | X | 0 | 0 | ACCEPT |
| FPD | X | 0 | X | X | 1 | FPD |
| | X | 1 | X | X | 1 | ACCEPT |

| CURRENT STATE | DATA | | | MAXTH_ DISCARD | NEXT STATE |
|---|---|---|---|---|---|
| | SOP | EOP | PD | | |
| ACCEPT | 0 | 0 | 0 | 0 | ACCEPT |
| | 0 | 0 | 1 | 1 | PPD |
| | 0 | 1 | 0 | 0 | ACCEPT |
| | 0 | 1 | 1 | 0 | ACCEPT |
| | 1 | 0 | 0 | 0 | ACCEPT |
| | 1 | 0 | 1 | 1 | FPD |
| | 1 | 1 | 0 | 0 | ACCEPT |
| | 1 | 1 | 1 | 1 | ACCEPT |
| PPD | X | 0 | 0 | 1 | PPD |
| | X | 0 | 1 | 1 | PPD |
| | X | 1 | 0 | 0 | ACCEPT |
| | X | 1 | 1 | 0 | ACCEPT |
| FPD | X | 0 | X | 1 | FPD |
| | X | 1 | X | 1 | ACCEPT |

NETWORK SWITCH PORT WITH WEIGHTED RANDOM EARLY DISCARD

BACKGROUND OF THE INVENTION

1. Field of the Invention

The present invention relates in general to a network switch port for storing incoming packets as sequences of cells in a cell memory until they can be forwarded, and in particular to a system for determining when to discard incoming cells as the number of cells stored in the cell memory approaches its maximum cell storage capacity.

2. Description of Related Art

A typical network switch for routing data transmissions (packets) between network buses includes a set of input switch ports for receiving packets arriving on the network buses, a set of output switch ports for forwarding packets outward on the network buses, and a switch fabric for routing packets between the input and output switch ports. Each input switch port includes a memory for storing packets arriving on a network until the switch fabric can forward them to an output switch port. Each output switch port may also include a memory for storing packets it receives via the switch fabric until the port can forward them outward on a network bus.

Since many networks transmit packets of variable size, some switch ports organize their memories into a set blocks, with each block being sufficiently large to hold the largest possible packet. However when many packets are much smaller than the maximum size, much of the storage capacity of most memory blocks is wasted. To make more efficient use of memory space, some input switch ports include a protocol processor for converting the incoming packet into a sequence of relatively small cells of uniform size. Each memory blocks is sized just large enough to hold a single cell. Such a switch port also includes a traffic manager for writing each cell of the sequence in a separate memory block cell and for reads reading the cells derived from a packet out of the cell memory and forwarding them onward to an output switch port via the switch fabric. The output switch port's traffic manager receives and stores cell sequence arriving from the switch fabric and later forwards it to another protocol processor which reassembles the cell sequence into a packet and forwards its outward on a network bus. By converting variable sized packets to sequences of uniformly sized cells, the network switch makes more efficient use of the data storage capacity of the input and output port memories because most memory blocks are completely filled with data.

Some network systems assign each packet to one of a set of "flows". For example packets originating from a particular source and directed to the same destination may be assigned to the same packet flow. The network may accord each flow with a particular class of service, and a flow's class of service affects the manner in which the network forwards packets assigned to that flow. For example a flow's class of service may determine the maximum and minimum rates at which a network switch may forward packets assigned to that flow, the priority with which the network switch forward packets of that flow relative to packets of other flows, and the amount of cell memory space that can be used for holding cells derived from packets assigned to that flow. Such network systems typically include a "flow identification number" (FIN) identifying packet's flow. The input switch port that converts a packet into a cell sequence incorporate the packet's FIN into each cell derived from the packet. When a traffic manager receives a cell it can read its FIN value and use it as a key into a database defining the cell's class of service. This enables the traffic manger to determine how to treat each cell packet for example with respect to forwarding rates and priority.

When a traffic manager is unable to forward cells as fast as it receives and stores them, its cell memory can fill up, and be unable to store any more incoming cells. Thus when a cell memory is full or is approaching full, it is necessary for the traffic manager to begin discarding incoming cells. One way to do that is to simply discard all cells of any packet arriving at a time when the cell memory is too full to hold all of the cells of the packet. However since in many network systems it is desirable to treat some packets with a higher forwarding priority than others, a port that simply waits until its cell memory is too full to accept a next incoming packet treats all packets with the same discard priority.

Some network switch ports allocate separate portions of cell memory space to various flows or groups of flows. Thus when a traffic manager receives an incoming cell sequence, it determines the amount of memory space assigned to the cells' flow and discards the incoming cell sequence, if cells of that flow are already occupying their maximum allotted space in cell memory. Such a system can provide some flows with a measure of priority over others with respect to discard operations by the manner in which it allocates memory space to various flows. For example high priority, low volume flows can be permitted to occupy all available cell memory space so that packets of such flows are never discarded if there is any available cell memory space. With lower priority flows being assigned to more limited portions of the cell memory space, they are more likely to be discarded.

While it is desirable to discard packets assigned to lower priority flows more frequently than packets assigned to higher priority flows, it is also desirable to discard packets assigned to flows of similar priority at similar rates. Suppose a traffic manager allocates a portion of its cell memory to a group of flows, all of which have the same priority. If the traffic manager waits until the cell memory space allocated to a group of flows is full or nearly full and then discards each incoming packets assigned to that group of flows when it is too large to be stored in any remaining unused portion of the allocated memory space, the discard burden is likely to be unevenly distributed among those flows. For example a flow that happens to include a burst of packets arriving at a switch port immediately after its allocated cell memory space is temporarily filled will bear all of the discard burden while packets of another flow arriving shortly thereafter when cell memory space happens to become available will bear none of the discard burden.

Some traffic managers employ a "random early discard" system to reduce the likelihood of such inequalities in discard burden distribution among flows. In a random early discard systems, the traffic manager not only allocates a maximum cell memory space to group of flows, it also establishes a threshold level below that maximum. When the number of cells in the cell memory is above the threshold level, but below the maximum level, the traffic manager discards some, but not all of the arriving packets assigned to those flows, with the decision as to whether to discard each incoming packet being made randomly or pseudo-randomly. Thus not all of the discard burden falls on packets arriving after the allocated cell memory space is completely filled; some of the burden falls on packets arriving before the allocated memory space is completely filled.

When flows of differing priority are allocated the same portion of memory space, each flow can be assigned a separate discard weight. The higher a flow's discard weight, the less likely that the traffic manger will discard packets assigned to that flow when the traffic manager is operating in a random early discard mode. Typically the traffic manager will randomly generate a number whenever a packet arrives, compare the random number to the packet's discard weight, and discard the packet if the random number exceeds the packet's discard weight.

One drawback to a random early discard system is that it may cause a traffic manager to unnecessarily discard packets. For example when a burst of incoming cells temporarily drives the number of stored cells above the random early discard threshold, the traffic manager begins discarding cells, even though the burst would not otherwise fill the allocated memory space to is maximum level. As long as the number of stored cells remains above the random early discard threshold level, the traffic manager will continue to unnecessarily randomly discard cells even when the rate at which cells arriving at the traffic manager falls to a level no greater than the rate at which the traffic manager is currently sending cells out of the cell memory. What is needed is a weighted random early discard system for a network switch that reduces the likelihood that packets will be unnecessarily discarded.

BRIEF SUMMARY OF THE INVENTION

A network switch port in accordance with the invention receives incoming packets, converts them into cell sequences and stores each cell in a cell memory. The switch port includes a traffic manager for queuing cells for departure from the cell memory and far then signaling the cell memory to read out and forward cells in the order they are queued. The traffic manager assigns each arriving cell to one of several flow queues based on the value of a flow identification number (FIN) included in each cell, and allocates each flow queue a limited amount of cell memory space in which to store cells assigned to that flow queue.

In accordance one aspect of the invention, the traffic manager computes a moving average of the number of cells assigned to each flow queue stored in memory, and begins randomly discarding incoming cells of a given flow queue whenever the computed moving average for that flow queue exceeds a predetermined "weighted random early discard" low (WRED_LOW) threshold level. Since the WRED_LOW threshold is based on a moving average of the number of stored cells assigned to a flow queue rather than on the current number of cells assigned to a flow queue, a short burst of incoming cells is less likely to unnecessarily trigger random early discard.

In accordance with another aspect of the invention, the traffic manager also establishes a "weighted random early discard" high (WRED_HIGH) threshold level for each flow queue, higher than the flow queue's WRED_LOW threshold level. The traffic manager divides the range between the WRED_LOW and WRED_HIGH levels into a set of smaller early discard ranges, and assigns a separate discard weight to each range. The higher the range, the higher the discard weight. When an incoming cell assigned to a particular flow queue arrives, the traffic manager determines whether the moving average the number of stored cells for that flow queue falls within one of the early discard ranges and if so, assigns that range's discard weight to the cell. The likelihood that the traffic manager will discard the cell thus increases with its assigned discard weight. When a flow queue's computed moving average rises above the WRED_LOW level, the probability that the traffic manager will discard cells assigned to that flow queue increases in proportion to the magnitude of the moving average.

In accordance with a further aspect of the invention, the traffic manager computes the moving average for each flow queue by periodically adding a fraction (X) of the current number of stored cells for that flow to a fraction (1−X) of a last computed moving average, with the value of X being separately adjustable for each flow queue. The value of X used during each calculation also depends on whether the current number of stored cells is greater than or less than the last computed average. Thus, for example for flow queues subject to bursts, the traffic manger can be configured to slowly increase the moving average when the number of stored cells is increasing and to rapidly decrease the moving average when the number of stored cells is decreasing. Such a configuration can reduce the number of cells that are unnecessarily discarded.

It is accordingly an object of the invention to provide a weighted random early discard system for a network switch that reduces the likelihood that packets will be unnecessarily discarded.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

Figure 2A:
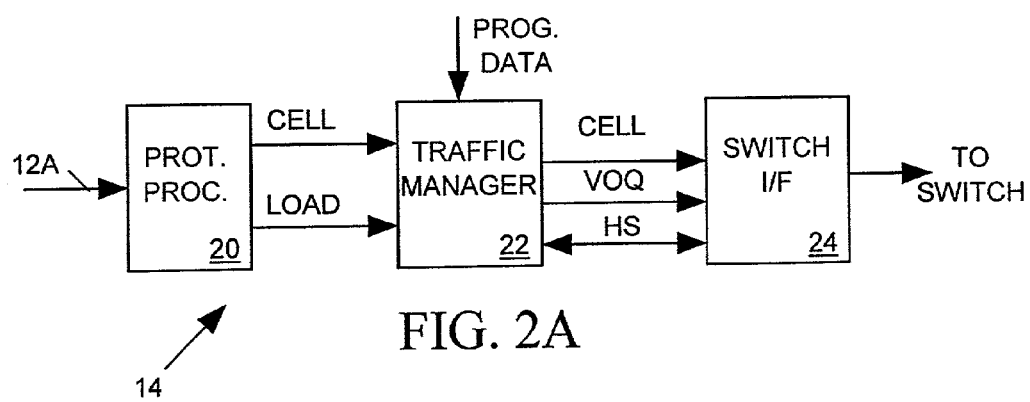
Figure 2B:
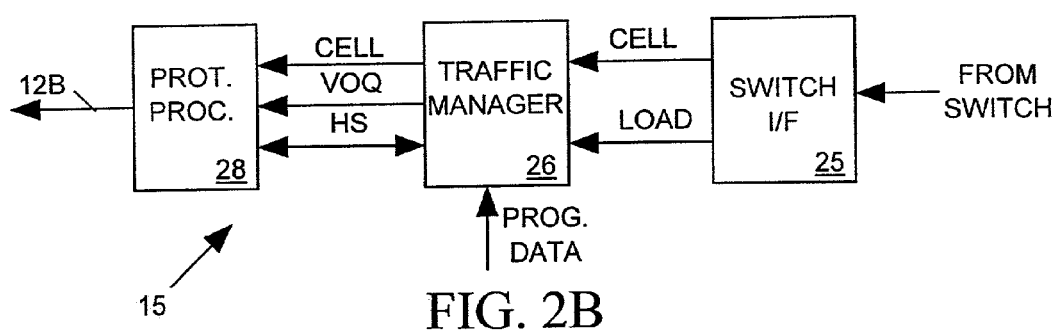
Figure 3:
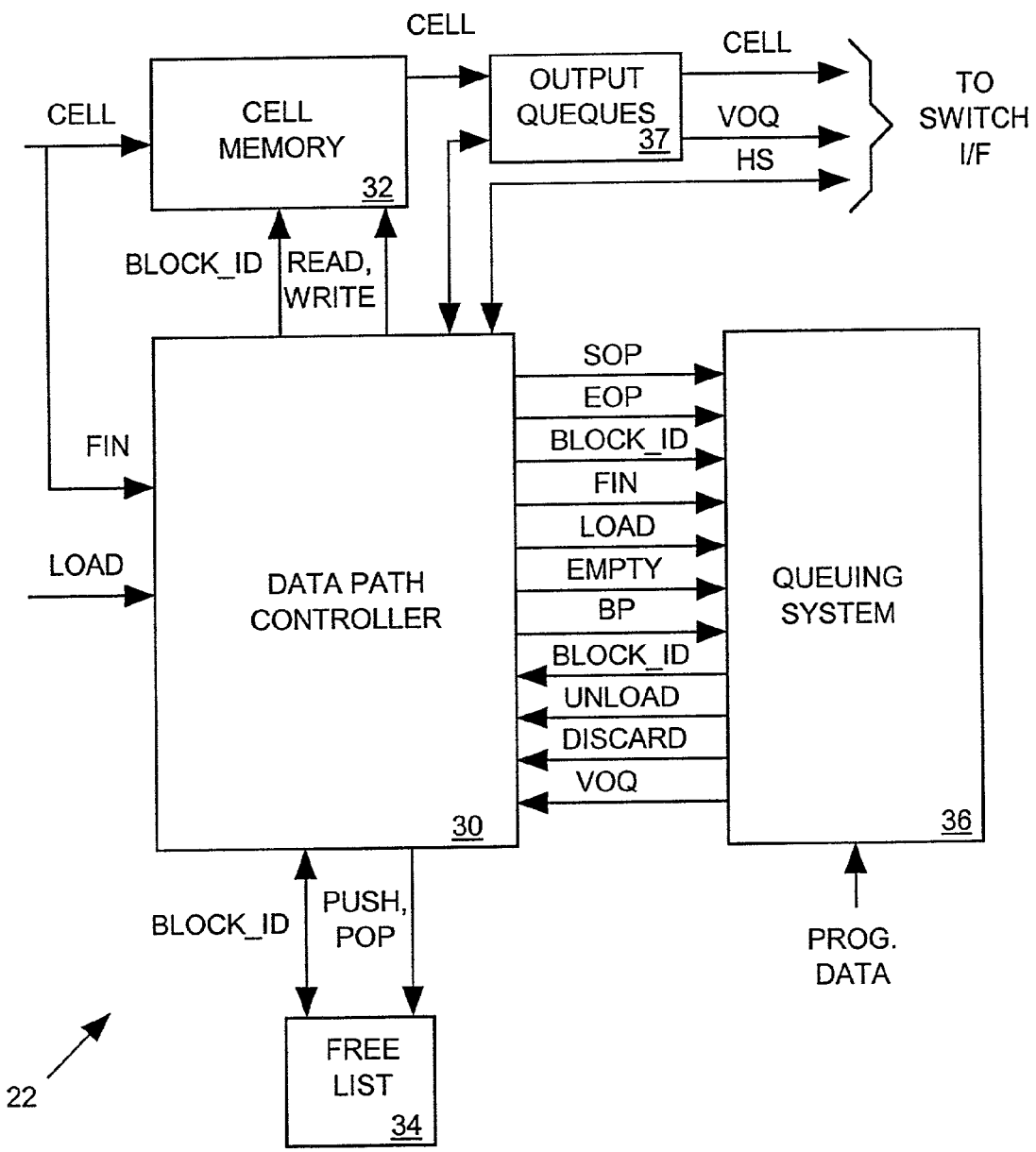
Figure 4:
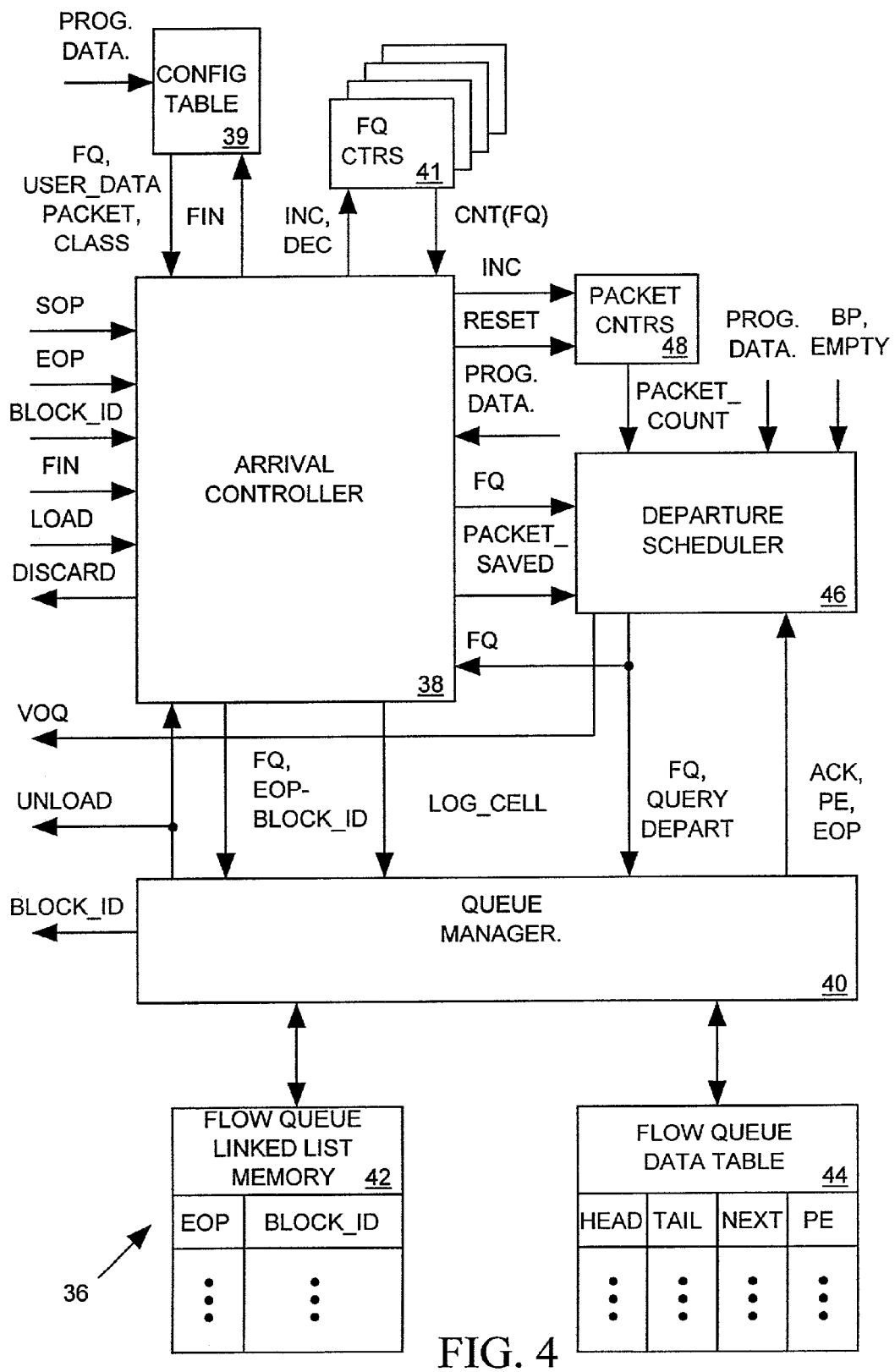
Figure 5:
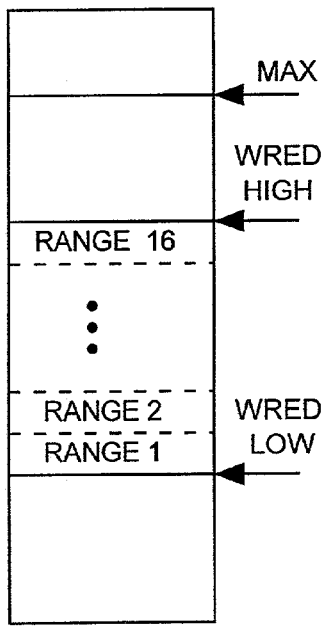
Figure 6:
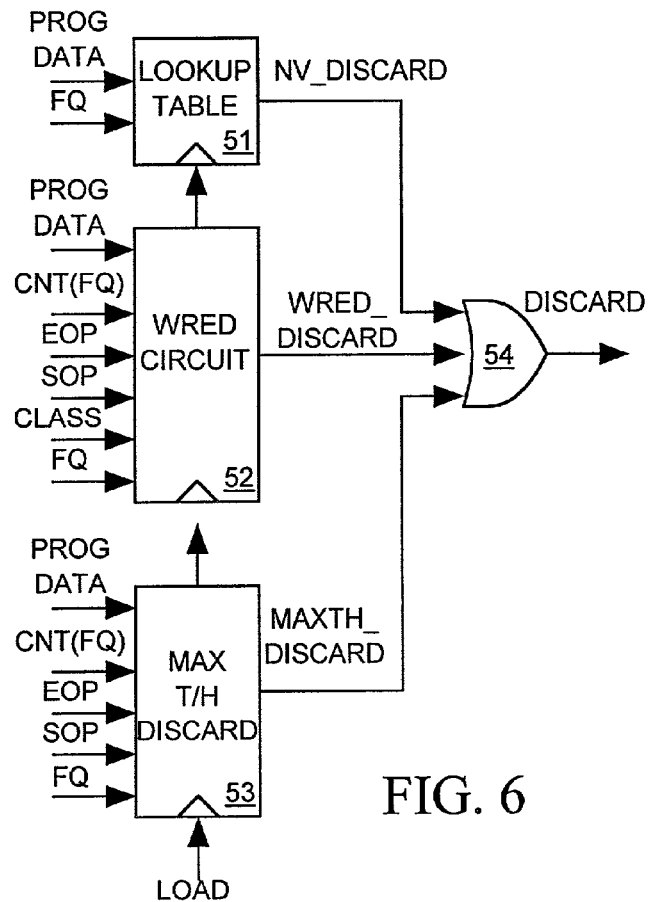
Figure 7:
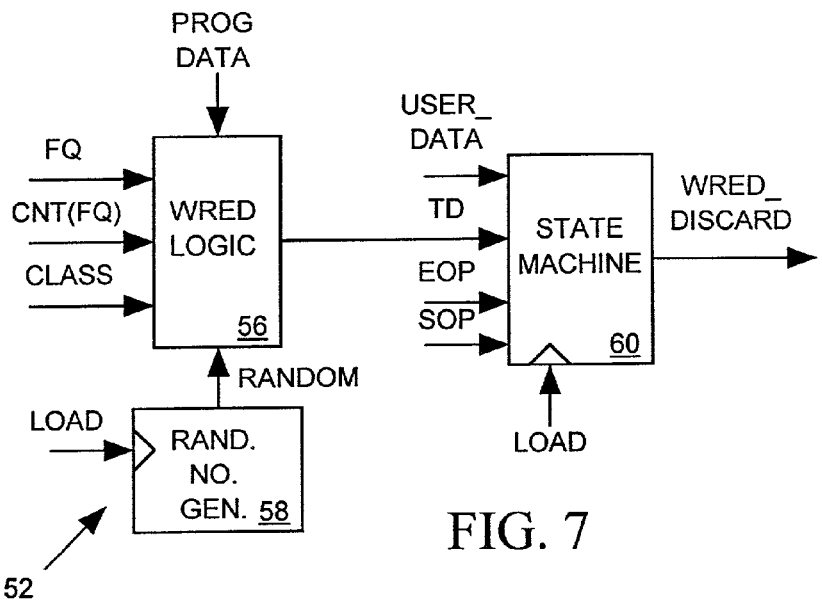
Figures 8, 9:
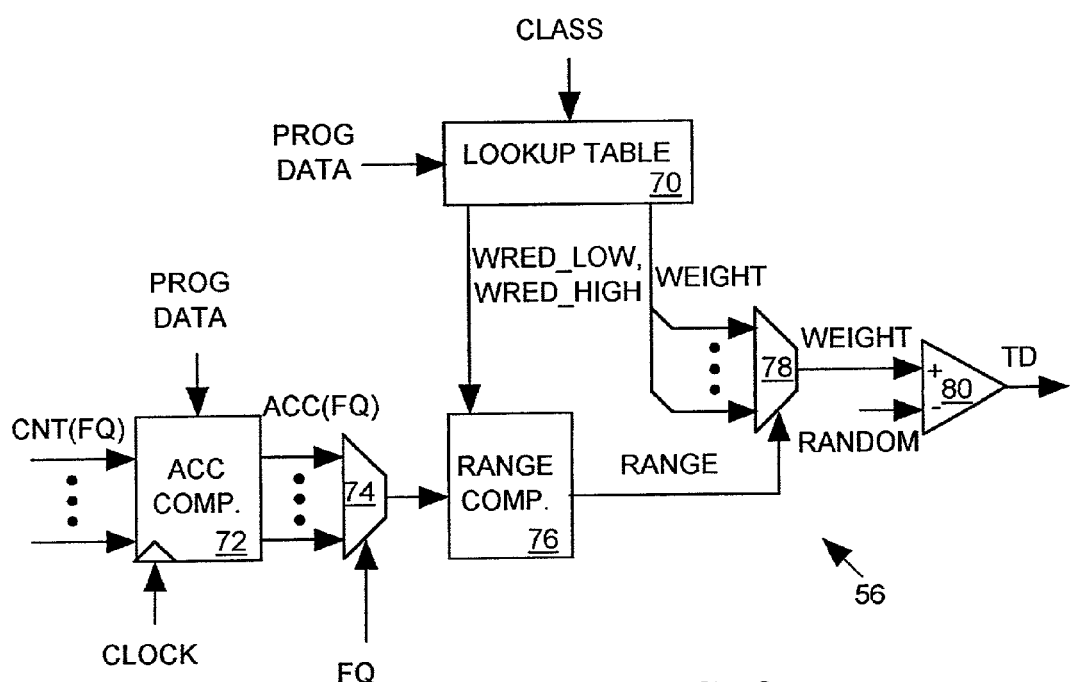

FIG. 1 illustrates a network switch 10 in accordance with the invention for routing network packets between network buses, FIG. 2A illustrates one input switch port of FIG. 1 in more detailed block diagram form, FIG. 2B illustrates one output switch port of FIG. 1 in more detailed block diagram form, FIG. 3 illustrates a traffic manager of FIG. 2A in more detailed block diagram form, FIG. 4 illustrates the queuing system of FIG. 3 in more detailed block diagram form, FIG. 5 is a chart illustrating how the arrival controller of FIG. 4 allocates memory space to a flow queue, FIG. 6 illustrates in block diagram form a random early discard system employed by the arrival controller of FIG. 4, FIG. 7 is a chart diagramming the behavior of the state machine of the weighted random early discard system of FIG. 6, and FIG. 8 illustrates the threshold logic circuit of the weighted random early discard system of FIG. 6.

Figures 10, 11:
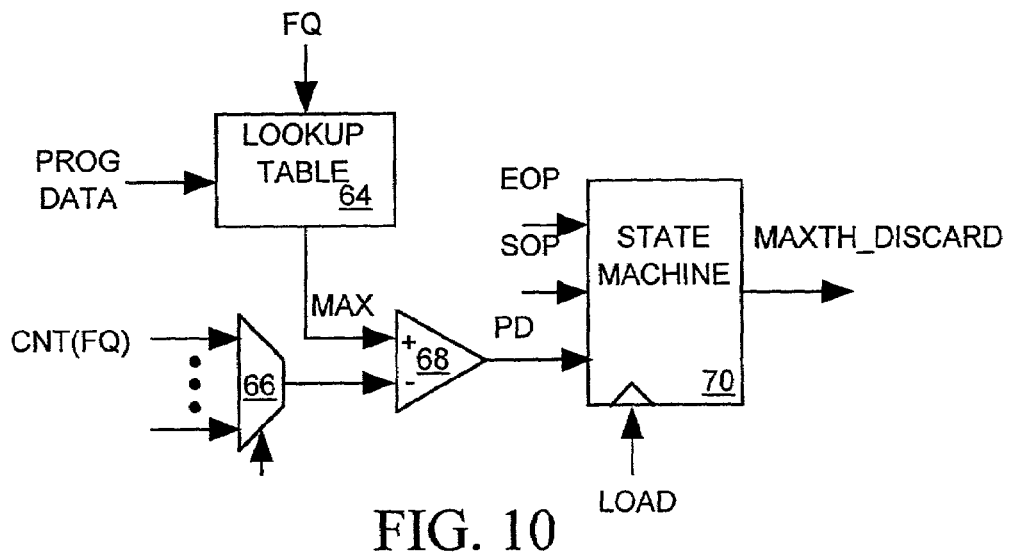

FIG. 9 depicts the WRED Logic circuit of FIG. 7 in more detailed block diagram form, FIG. 10 depicts the maximum threshold discard circuit of FIG. 8 in more detailed block diagram form, FIG. 11 is a state diagram describing logic of the state machine of FIG. 10.

DETAILED DESCRIPTION OF THE INVENTION

Network Switch

FIG. 1 illustrates a network switch 10 in accordance with the invention for routing network transmissions (packets) between a set of network buses 12. Network switch 10 includes input switch ports 14, output switch ports 15, a crosspoint switch 16, and a routing control circuit 18. Each input switch port 14 receives incoming packets arriving on a separate input bus 12A and each output port 15 forwards outgoing packets on a separate output bus 12B. Although not shown in FIG. 1, each input switch port 14 may receive packets on more than one incoming bus 12A and each output port may forward outgoing packets on more than one outgoing bus 12B. Crosspoint switch 16 selectively provides signal paths between input switch ports 14 and output ports 15 in response to control data from routing control circuit 18 based on routing requests from input switch ports 14.

Incoming packets arriving on buses 12A are network data transmissions that may be of any of a variety of formats such as, for example, variable length Ethernet packets. Each input switch port 14 converts each incoming packet to a sequence of one or more "cells" of uniform size and format, and stores each cell in an internal cell memory. Based on information included in each packet arriving on one of buses 12A, the input switch port 14 that received the packet determines which output switch port 15 must forward the packet outward on one of outgoing buses 12B toward its intended destination. The receiving input switch port 14 then requests routing control circuit 18 to establish a signal path through crosspoint switch 16 to the appropriate output switch port 15. When routing control circuit 18 grants the request, the receiving input switch port 14 sequentially forwards all of the cells of the packet to the forwarding output switch port 15 via crosspoint switch 16. That output input switch port 15 stores the cells in its own cell memory as they arrive. After receiving all of the cells derived from the incoming packet, the output switch port 15 reassembles the packet from those cells and forwards the packet outward on one of outgoing network buses 12B.

Switch Ports

FIG. 2A illustrates one input switch port 14 of FIG. 1 in more detailed block diagram form. Switch port 14 includes a protocol processor 20 for converting incoming packets on bus 12A into cell sequences. As protocol processor 20 produces each cell, it pulses a LOAD signal input to a traffic manager 22 to indicate when a CELL is available. Traffic manager 22 temporarily stores the cells derived from each received packet in an internal cell memory and determines from data included in the packet which output switch port 15 is to forward the packet outward from network switch 10. Thereafter traffic manager sequentially forwards the cells of the packet to a switch interface circuit 24 using handshaking signals HS to coordinate transfer of the cell. Traffic manager 22 also sends a code (VOQ) to switch interface 24 with each cell, the VOQ code identifying the output switch port 15 to receive the cell. Switch interface circuit 24 stores each incoming cell and then requests routing control circuit 18 for a signal path to the forwarding output switch port 15 through crosspoint switch 16 of FIG. 1, and thereafter forwards the cell to the forwarding output switch port 15 via the requested signal path.

FIG. 2B illustrates one output switch port 15 of FIG. 1 in more detailed block diagram form. When its switch interface 25 receives cells from crosspoint switch 16 it forwards them to a traffic manager 26, pulsing a LOAD signal input to indicate when each cell is available. Traffic manager 26 store each cell in an internal cell memory as its arrives from switch interface 25, and after receiving the last cell of a sequence derived from an incoming packet, traffic manager 26 forwards the cell sequence to a protocol processor 28 using handshaking signals HS to coordinate the transfer.

Protocol processor 28 then reassembles the packet from the cell sequence and forwards it outward on the outgoing network bus 12B.

Traffic Manager

FIG. 3 illustrates the input switch port's traffic manager 22 of FIG. 2A in more detailed block diagram form. (The output switch port's traffic manager 26 of FIG. 2B is generally similar in design and operation.) Referring to FIG. 3, traffic manager 22 includes a data path controller circuit 30 for responding to each LOAD signal pulse from protocol processor 20 (FIG. 2A) by writing the cell into a block of storage locations within a cell memory 32. Data path controller 30 maintains in a memory a "free list" 34 of addresses of unused cell memory blocks. When a cell arrives from protocol processor 20, data path controller 30 pops an identification number (BLOCK_ID) of an available memory block from free list 34, passes the BLOCK_ID to cell memory 52, and pulses a WRITE signal telling cell memory 32 to store the incoming cell in the memory block identified by BLOCK_ID.

The network system assigns each packet to one of a set of "flows". Each flow has a defined class of service influencing, for example, the maximum and minimum rates and priority with which the network switch forwards packets assigned to the flow. The flow to which a packet is assigned also determines which output port 15 (FIG. 1) is to forward the packet outward from the network switch. Each incoming data packet includes a "Flow Identification Number" (FIN) identifying the flow to which the packet has been assigned. When protocol processor 20 converts an incoming packet into a sequence of one or more cells, it includes the packet's FIN in each cell along with start of packet (SOP) and end of packet (EOP) bits indicating whether the cell is the first and/or last cell of the sequence of cells derived from the packet.

As it stores a cell in cell memory 32, data path controller 30 passes the cell's FIN, SOP bit and EOP bit, along with the BLOCK_ID of cell's storage location to a queuing system 36 and then pulses a LOAD signal to tell the queuing system when a cell has been stored in cell memory 32. Queuing system 36 uses the FIN, BLOCK_ID, SOP and EOP data to keep track of where the cells of each packet are stored in cell memory 32, to keep track of an order in which cells arrived, to keep track of which cells belong to the same packet, to determine an order in which data path controller 30 is to forward cells out of cell memory 32 to switch interface 24 of FIG. 2A, and to determine the VOQ number associated with the switch output port 15 (FIG. 1) that is to forward the packet outward from the network switch. Programming data (PROG DATA) supplied as input to queuing system 36 tells it how to determine forwarding priority, forwarding rates and forwarding output switch ports for all cells based on the cell's FIN.

Queuing system 36 also determines whether each arriving cell includes a valid FIN. When the FIN of an incoming cell is not valid, queuing system 36 returns a DISCARD signal in response to the LOAD signal telling data path controller 30 to push the cell's BLOCK_ID back on free list 34, thereby effectively discarding the cell without forwarding it to crosspoint switch 16. Programming data input to queuing system 36 also allocates space in cell memory 32 to classes of cells based on their FINs. When the number of cells of a particular class approaches limits defined by the programming data, queuing system 36 signals data path controller 30 to discard some or all of the arriving cells of that class.

When queuing system 36 decides that it is time for data path controller 30 to forward a particular cell out of cell memory 32, it sends the cell's BLOCK_ID and the VOQ number associated with the cell's destination output switch port 15 (FIG. 1) to the data path controller and then pulses an UNLOAD signal. Data path controller 30 then forwards the BLOCK_ID to cell memory 32 and pulses a READ signal, causing cell memory 32 to shift the cell into one of a set of output queues 37, each associated with a separate VOQ number. Controller 30 then pushes the cell's BLOCK_ID back onto free list 34 to make the cell memory block available for holding another arriving cell.

When any one of output queues 37 is not empty, controller 30 uses handshaking signals HS to sequentially forward departing cells out of the output queue 37, along with the VOQ number associated with the output queue to switch interface switch 24 of FIG. 2A as fast as the switch interface circuit can accept them. When output queues 37 are all empty, controller 30 asserts an EMPTY signal input to queuing system 36 telling it that it may temporarily increase the rate at which it normally schedules cells for departure. When its internal departure buffer is nearly full, controller 30 uses a multibit back pressure signal (BP) to tell queuing system 36 to reduce slow down the rate at which it schedules cells for departure. When its internal departure buffer is full, controller 30 sets the BP signal to tell queuing system 36 to stop scheduling cells for departure.

Queuing System

FIG. 4 illustrates queuing system 36 of FIG. 3 in more detailed block diagram form. An arrival controller circuit 38 acquires the SOP, EOP, BLOCK_ID, and FIN data from data path controller 30 of FIG. 3 when the data path controller asserts the LOAD signal to indicate the arrival of a cell at data input terminals of cell memory 32. Arrival controller 38 applies the incoming FIN to a "configuration table" 39, a lookup table programmed by input programming data. Configuration table 39 returns a set of configuration data (FQ, USER_DATA, PACKET, and CLASS) telling queuing system 36 how to handle the cell.

The returned flow queue data FQ identifies the particular flow queue to which the incoming cell has been assigned based on its FIN. When configuration table 39 does not return a valid FQ number, arrival controller 38 signals data path controller 30 to discard the cell. As discussed below, the flow queue to which cells are assigned influences the priority and rate with which the traffic manager forwards those cells to the switch interface and also determines which output switch port is to forward the cell outward from the network switch. The traffic manager may maintain many flow queues. Configuration table 39 assigns all cells of the same flow (i.e., all cells having the same FIN) to the same flow queue, though it may assign several flows to the same flow queue. All cells of the same flow queue are forwarded from the cell memory in the order they arrive, but since some flow queues have higher priority than others, cells assigned to different flow queues do not necessarily depart the cell memory in the order they arrive.

Arrival controller 38 keeps track of the number, CNT (FQ), of cells of each flow queue type stored in cell memory 32 of FIG. 3 using a separate counter 41 for each flow queue. Whenever an incoming cell arrives, configuration table 39 returns the cell's assigned FQ number, and arrival controller 38 increments the output CNT(FQ) of the corresponding FQ counter 37. Whenever a cell is forwarded out of cell memory 32, arrival controller 38 decrements the count associated with the departing cell's FQ.

Input programming data to arrival controller 38 allocates a particular maximum amount of the cell memory space to each flow queue. Arrival controller 38 uses counters 37 to keep track of the number of cells of each flow queue stored in cell memory 32 of FIG. 3 because it needs to know when the number of stored cells allocated to each flow queue exceeds various levels defined by input programming data. This can happen when incoming packets for a particular flow queue arrive in the cell memory faster than they can be forwarded. When the amount of cell memory space occupied by a particular flow queue reaches any of those levels, arrival controller 38 begins to signal the data path controller 30 of FIG. 3 to randomly discard some of the incoming cells for that flow queue. As described in more detail below, as the number of cells of a given flow queue in the cell memory rises to higher levels, arrival controller 38 more frequently discards incoming cells assigned to that flow queue. The CLASS data configuration table 39 returns to arrival controller 38 in response to a cell's FIN data tells it how to assign a "discard weight" to the cell. When the number of cells in the cell memory assigned to a particular FQ reaches a defined limit, data path controller 30 begins to discard cells of that FQ; the higher an incoming cell's discard weight, the greater the probability that data path controller 30 will choose to discard that cell. Thus the CLASS data can be give cells assigned to the same flow queue differing levels of discard priority based on their FINs.

A USER_DATA bit returned by configuration table 39 indicates whether the cell contains data from a normal system user or contains management data used internally for network control functions. Cells containing management data are very high priority, though normally low in volume, and are never discarded. Cells from system users can be very high volume, but may be discarded when necessary to keep cell memory 32 from getting too full.

When it decides an incoming cell has a valid FQ and is not to be discarded, arrival controller 38 forwards the cell's FQ number, EOP bit and BLOCK_ID to a queue manager 40 and pulses a LOG_CELL signal to tell a queue manager 40 that cell data is available. Queue manager 40, which keeps track of each cell's storage location in cell memory 32 of FIG. 3, responds to the LOG_CELL signal by adding a new entry in a linked list memory 42. Linked list memory 42 has a separate address for each BLOCK_ID in cell memory 32 of FIG. 3. Queue manager 40 maintains a separate linked list in memory 42 for each flow queue, and each entry in a flow queue's linked list is associated with a cell stored in cell memory 32 that has been assigned to that particular flow queue. Each cell's FQ linked list 42 entry is stored at the memory 42 address indicated by the cell's BLOCK_ID and includes the cell's EOP bit and the BLOCK_ID of the next arriving cell, if any, of the same flow queue.

When a cell arrives in cell memory 32, it is necessary for queue manager 40 to keep track of whether an individual cell was part of a group of cells derived from a single incoming packet only when the cells of that sequence are to be forwarded from the cell memory as an uninterrupted cell sequence (on a "sequence-by-sequence" basis) without being interleaved with cells of any other cell sequence. Accordingly, when the PACKET bit returned by configuration table 39 is true, arrival controller 38 forwards the cell's original EOP bit state to queue manager 40 with the cell's FQ and BLOCK_ID numbers, thereby preserving each cell's identity as a part of a multiple cell sequence derived from a packet. Thereafter, that cell and all other cells of its sequence are scheduled for departure from the cell memory as an uninterrupted sequence not interleaved with any other cell sequences. However when all cells of a sequence derived from a packet indicates are to be forwarded from the cell memory on a cell-by-cell basis, such that the cell sequence may be interleaved with other cell sequences, configuration table 39 returns a logically false PACKET data bit to arrival controller 38 in response to the FIN number included in each cell of the sequence. This tells arrival controller 38 to automatically set logically true the EOP bit it forwards to queue manager 40 with each incoming cells' FQ and BLOCK_ID number. In such case, each cell of the sequence is thereafter treated like it is a single-cell sequence rather than a part of a larger sequence of cells when it is thereafter scheduled for departure from the cell memory. This enables that particular cell sequence to later depart the cell memory interleaved with other cell sequences.

Queue manager 40 keeps the BLOCK_ID of the longest-stored and most recently stored cells of each FQ in HEAD and TAIL fields of an entry of a flow queue data table 44 associated with the FQ. The HEAD cell is the next cell to be actually forwarded from the cell memory. Departure scheduler 46 internally queues cells of each flow queue for departure, and signals queue manager when each cell reaches the head of a queue and is ready to be forwarded out of the cell memory. Queue manager 40 stores the BLOCK_ID of the next cell to be queued for departure from the cell memory is stored in the NEXT field. As discussed below, queue manager 40 updates the NEXT field whenever departure scheduler queues a cell of the flow queue for departure.

A packet end (PE) bit stored in table 44 indicates whether any currently stored cell of the flow queue has an EOP bit that is set true. When cells of the flow queue are forwarded on a cell-by-cell basis, then all cells of that flow queue will have true EOP bits and the PE bit in the table 44 entry for that flow queue will always be true as long as any cell of the flow queue resides in the cell memory. However, when cells of a flow queue are forwarded on a packet-by-packet basis, then only the last cell of each packet's cell sequence has a true EOP bit. In such case the PE field of the entry in table 44 will only be true if the last cell of at least one packet sequence currently resides in the cell memory. As discussed later, the PE bit field in table 44 prevents the first cells of a packet of a flow queue that is to be scheduled for departure from the cell memory a packet-by-packet basis from being scheduled for departure before the last cell of the packet has arrived in the cell memory. Queue manager 40 updates the TAIL and PE fields of table 44 whenever a cell actually arrives in the cell memory, updates the NEXT field whenever next cell of a flow queue is scheduled for departure from the cell memory, and updates the HEAD field whenever a cell is actually forwarded from the cell memory.

When any cell of a packet arrives with an EOP bit set true, arrival controller 38 transmits the incoming FQ number for that flow queue to a departure scheduler 46 and pulses a PACKET_SAVED signal to indicate that all of the cells of an incoming packet have been saved in the cell memory 32 of FIG. 3. Arrival controller 38 maintains a count (PACKET_COUNT) in one of a set of counters 48 of the number of cells for each arriving packet. Arrival controller 38 increments the count whenever a cell arrives and resets the count whenever it receives an SOP signal from data path controller 30. When departure scheduler 46 receives the PACKET_SAVED signal it acquires the current count (PACKET_COUNT) from one of packet counters 48. The incoming FQ and PACKET_COUNT data tell departure scheduler 46 the flow queue number of the most recently arrived packet and the number of cells that were derived from the packet.

FIG. 5 is a chart illustrating how the programming data input to arrival controller 38 of FIG. 4 allocates cell memory space to each flow queue. The programming data defines three threshold levels: WRED_LOW, WRED_HIGH and MAX. As mentioned above, arrival controller 38 computes a moving average of the number of cells stored in the cell memory for each flow queue. When the moving average resides between the WRED_LOW and WRED_HIGH levels, arrival controller 38 will randomly discard some of the incoming cells, provided the cells are user-data cells and not high priority management cells. When the moving average exceeds the WRED_HIGH level, arrival controller 38 will discard all user-data cells. The MAX level is the maximum amount of cell memory space cells the flow queue may occupy. Arrival controller 38 will discard all incoming cells (including user-data and system management cells) assigned to the flow queue when the number of currently stored cells reaches equals the MAX level.

Arrival controller 38 divides the allocated memory space between the WRED_LOW and WRED_HIGH threshold levels into (suitably) sixteen ranges. Input programming data assigns a separate discard weight to each range; the higher the range, the higher the discard weight. When the moving average number of stored cells for a given flow queue is within one of those ranges, the cell is assigned the discard weight for that range. The likelihood that arrival controller 38 will discard the cell increases with the cell's assigned discard weight. Thus the probability that data path controller 30 will discard and incoming cell increases as the moving average number of cells moves from the WRED_LOW threshold level toward the WRED_HIGH threshold level.

Discard System

FIG. 6 illustrates in block diagram form a discard system 50 employed by arrival controller 38 of FIG. 3 for generating DISCARD signal pulses it sends to data path controller 30 of FIG. 3 for telling it to discard incoming packets. As discussed above configuration table 35 returns an FQ number in response to the FIN included in each incoming cell when data path controller 30 of FIG. 3 is ready to write the cell into cell memory 32. As seen in FIG. 6, a lookup table 51 data responds to each LOAD signal pulse from data path controller 30 announcing arrival of a cell by checking the flow queue number FQ generated by configuration table 35 of FIG. 4 in response to the cell's FIN to determine whether the FQ number is valid. Input programming data tells decoder 51 which FQ numbers are valid. When the FQ number is not valid, decoder 53 pulses an input signal NV_DISCARD to an OR gate 54 causing the OR gate to pulse the DISCARD signal input to data path controller 30 telling it to discard the incoming cell.

A weighted random early discard (WRED) circuit 52 responds to each LOAD signal by determining whether the incoming cell is to be a randomly discarded cell. If so WRED circuit 52 pulses an input signal WRED_DISCARD to OR gate 54 causing it to pulse its output DISCARD signal, thereby telling the arrival controller to discard the incoming cell.

A maximum threshold circuit 53 responds to each LOAD signal by determining whether the incoming cell is to be discarded because the number of cells stored in memory assigned to the flow queue referenced by the FQ number has reached the maximum threshold level for the flow queue. If so, circuit 53 pulses a MAXTH_DISCARD signal input to OR gate 54 causing it to pulse its output DISCARD signal, thereby telling the arrival controller to discard the incoming cell.

Weighted Random Early Discard Circuit

FIG. 7 illustrates WRED circuit 52 of in more detailed block diagram form. WRED circuit 52 includes a WRED logic circuit 56 which receives the count outputs CNT(FQ) of flow queue counters 37 (FIG. 4) indicating the current number of cell currently stored in cell memory 32 (FIG. 3) assigned to each flow queue. Based on these counts, WRED circuit 52 periodically calculates a moving average of cells assigned to each stored in the memory.

WRED circuit also assigns a discard weight to the incoming cell based on its FQ number and on the range in which the current moving average for that FQ count falls. When the assigned weight exceeds the value of a random number (RANDOM) produced by a random number generator 58 clocked by the LOAD signal, WRED logic circuit 56 pulses an output signal TD. The TD signal and the SOP and EOP bits included in the incoming cell, along with the USER_DATA output bit of configuration table 35 provide data inputs to a state machine 60. State machine 60, clocked by the LOAD signal from arrival controller 36, determines from its input signals whether to pulse the WRED_DISCARD signal to discard the incoming cell.

FIG. 8 is a state diagram illustrating operation of state machine 60 of FIG. 7. In this state diagram a "1" designates a bit set true, a "0" designates a bit set false, and an "X" means a bit that may be either true or false. Normally state machine 60 resides in an ACCEPT state in which all cells are accepted and stored in the cell memory as long as the WRED logic circuit has refrained from asserting the TD signal. However when the USER_DATA output of configuration table 35 classifies an incoming data cell as user data that can be discarded (USER_DATA true), when the cell is the first cell of a sequence (SOP true), when the TD signal indicates that the cell should be discarded (TD TRUE), state machine 60 drives the WRED_DISCARD signal true tell arrival controller 38 (FIG. 4) to discard the cell. If the cell is also the last cell of a sequence (EOP true) then state machine 60 remains in the ACCEPT mode. However if the cell is not the last cell of a sequence (EOP false) then state machine 60 enters a full packet discard state (FPD).

In the FPD state machine 60 always sets the WRED_DISCARD signal true after each LOAD signal puts so that every cell of the incoming cell sequence is discarded regardless of the state of the TD signal. State machine 60 remains in the FPD state until the last cell of the incoming cell sequence arrives (EOP true). It then returns to the ACCEPT state.

Thus when the first cell of a cell sequence arrives, state machine 60 decides whether or not to discard that cell and every other cell of that sequence based an the state of the FD signal WRED logic circuit 56 produces when the first cell arrives. Therefore WRED circuit 52 tells arrival controller 38 to discard only entire cell sequences; it does not tell arrival control 38 to save some cells of a sequence and discard others.

FIG. 9 illustrates weighted random early discard logic circuit 56 of FIG. 6 in more detailed block diagram form. WRED logic circuit 56 includes a lookup table 70 for converting the CLASS data output of configuration table 35 of FIG. 4 into WRED_LOW, WRED_HIGH and weight data it uses to determine the state of the output TD signal. A moving average cell count computation circuit 72 clocked by an input CLOCK signal periodically computes the moving average cell count ACC(FQ) for each flow queue based on the CNT(FQ) data for each flow queue produced by counters 37 of FIG. 4.

When the current count CNT(FQ) for a given flow queue FQ exceeds the last-computed moving average ACC'(FQ) for that flow queue, then computation circuit 71 computes the next ACC(FQ) value as follows:

$$ACC(FQ)=[X\_UP(FQ)*ACC'(FQ)]+[(1-X\_UP(FQ))*CNT(FQ)]$$

When the current count CNT(FQ) for a given flow queue FQ does not exceed the last computed moving average ACC'(FQ) for that flow queue, then computation circuit 71 computes the next ACC(FQ) value as follows:

$$ACC(FQ)=[X\_DOWN(FQ)*CNT(FQ)]+[(1-X\_DOWN(FQ))*ACC'(FQ)]$$

The X_UP(FQ) and X_DOWN(FQ) have values between 0 and 1. Programming data input to computation circuit 71 independently sets values of X_UP(FQ) and X_DOWN(FQ) for each flow queue. Generally when a flow queue is expected to experience bursts of incoming packets, the X_UP(FQ) and X_DOWN(FQ) values are suitably set high. This causes the discard rate to ramp up quickly when a packet burst is causing a rapid increase in the number of stored cells and to fall off quickly after the burst is over. The X_UP(FQ) and X_DOWN(FQ) are suitably set to low values for flows where the number of store cells are expected to change slowly.

A multiplexer 74 controlled by an incoming cell's FQ number delivers the average cell count data ACC(FQ) for that flow queue to a range computation circuit 76. Range computation circuit 67, which retrieves the WRED_LOW and WRED_HIGH data from lookup table 70, produces output data RANGE indicating whether the ACC(FQ) data output of multiplexer 74 is above the WRED_HIGH level, below the WRED_LOW level, or between the WRED_HIGH and WRED_LOW level. In the later case the RANGE data indicates which of the 16 ranges (FIG. 5) the ACC(FQ) value resides in. The RANGE data controls another multiplexer 78 which selects an appropriate weight data (WEIGHT) for the incoming cell from among a set of weight data values provided by lookup table 70. Multiplexer 78 supplies the selected WEIGHT data to a comparator 80. When the cell's WEIGHT exceeds the value of the RANDOM data produced by random number generator 58 of FIG. 6, comparator 80 asserts the TD output signal.

When the ACC(FQ) data is above the WRED_HI threshold value, the selected WEIGHT data is larger than all possible values of the RANDOM data so that the TD signal is always asserted. When the ACC(FQ) data is less than the WRED_LOW threshold value, the WEIGHT data is set lower than all possible values of the RANDOM data so that the TD signal is never asserted. Otherwise when the ACC(FQ) data lies between the WRED_LOW and WRED_HIGH values, the selected WEIGHT data lies between the largest and smallest possible RANDOM data values, and the probability that the TD signal is an increasing function of the RANGE data.

Maximum Threshold Discard

FIG. 10 illustrates maximum threshold circuit 53 of FIG. 6 in more detailed block diagram form. A lookup table 64 determines the maximum threshold level MAX for the incoming cell's flow queue identified by the FQ output of configuration table 39 of FIG. 4 and supplies it as input to a comparator 66. The FQ number also tells a multiplexer 68 to supply the count output CNT(FQ) of one of FQ counters

41 of FIG. 4 indicating the number of cells for that flow queue currently residing in the flow queue. Comparator 66 drives its output signal MTH true when the number of cells currently in the cell memory is at least as large as the maximum threshold level MAX for that flow queue. The MTH output bit of comparator 66 and the cells EOP and SOP bits are supplied as input to a state machine 70 which asserts the output MAXTH_DISCARD signal in response to the LOAD signal when the cell is to be discard.

FIG. 11 is a state diagram illustrating the logic of state machine 70. State machine 70 normally resides in an ACCEPT mode wherein it holds the MAXTH_DISCARD signal low as long as the MTH signal is not asserted so that no cells are discarded, However when the MTH is asserted, and the incoming cell is the first cell of a sequence (SOP=1), then state machine 70 asserts the MATH_DISCARD signal to discard the cell and enters a full packet discarded state (FPD) in which it discards every other cell of the sequence regardless of the state of the MTH signal. State machine 70 returns to the ACCEPT state when the last cell of the sequence arrives (EOP=1).

When the MTH signal is asserted while state machine 70 is in the ACCEPT mode, and the incoming cell is neither the first nor the last cell of the sequence (SOP=EOP=0), then state machine discards the cell (sets MAXTH_DISCARD=0 and enters a partial packet discard state (PPD) wherein it discards all remaining cells of the sequence except the last cell (EOP=1). When the last cell arrives, it drives the MAXTH_DISCARD signal low and returns to the ACCEPT signal.

When the MTH signal is asserted while state machine 70 is in the ACCEPT mode, and the incoming cell is the last cell of a sequence, state machine 70 stays in the ACCEPT mode. When the cell is both the first and last cell of the sequence (EOP=SOP=1), then MAXTH_DISCARD is drive true and the cell is discarded. However if the cell is the last but not the first cell of the sequence (EOP=1, SOP=0) then the state machine keeps MAXTH_DISCARD signal low so that the cell is saved.

Thus when the first cell of a sequence exceeds the maximum threshold level for the flow queue to which the sequence has been assigned, that cell, and every other cell of the sequence, is discarded (full discard). When a cell other than the first cell of a sequence is discarded, then every other cell of that sequence other than the last cell of a sequence is discarded (partial discard). In any case the last cell of a sequence is saved whenever the first cell of the sequence has been saved. This is done to ensure that any partial sequence of cells stored in the cell memory has a legitimate ending cell marking the end of the sequence.

Thus has been shown and described a traffic manager for a network switch port that computes a moving average of the number of stored cells assigned to each flow queue. The traffic manager randomly discards incoming cells of a given flow queue whenever the computed moving average for that flow queue lies between predetermined weighted random early discard low (WRED_LOW) and weighted random early discard high (WRED_HIGH) threshold levels for that flow queue. The traffic manager divides the allocated memory space between the WRED_LOW and WRED_HIGH levels into a set of early discard ranges, assigns a increasingly higher discard weights to each range to increase the likelihood of discarding an incoming cell when the average cell count resides in higher ranges.

While the forgoing specification has described preferred embodiment(s) of the present invention, one skilled in the art may make many modifications to the preferred embodiment without departing from the invention in its broader aspects. The appended claims therefore are intended to cover all such as fall within the true scope and spirit of the invention.

I claim:

1. A method for a network switch port for receiving and storing data included in incoming packets that vary in size and then forwarding the data from the network switch port, the method comprising the steps of:
   a. receiving each incoming packet and generating a cell sequence curresponding to the incoming packet, wherein each cell of the cell sequence contains a separate portion of the data included in the incoming packet, and wherein each cell of each generated cell sequence is of a uniform size;
   b. making a determination with respect to at least one cell of each cell sequence generated at step a as to whether to discard the cell or to store the cell in a memory, and then one of storing the cell in the memory or discarding the cell in accordance with the determination;
   c. reading cells out of the memory and forwarding them from the network switch port; and
   d. repetitively generating an estimate of an average number of cells stored in the memory during a period immediately preceding generation of the estimate, wherein the determination made at step b is a function of the generated estimate.

2. The method in accordance with claim 1 wherein step b comprises the substeps of:
   b1. assigning the cell a discard weight that is a function of the estimated average number of cells stored in the memory generated at step d;
   b2. generating a random number;
   b3. comparing the cell's assigned discard weight to the random number to produce result data indicting whether the discard weight exceeds a value of the random number,
   b4. making the determination as to whether to discard the cell or to store the cell in the memory as a function of the result data; and
   b5. one of storing or discarding the cell in the memory in accordance with the determination made at step b4.

3. The method in accordance with claim 2 wherein the discard weight assigned to the cell at step b1 is a function of an amount by which the estimated average number of cells stored in the memory exceeds a threshold level.

4. The method in accordance with claim 2 wherein step b1comprises the substeps of:
   b11. allocating a separate discard weight for each of a plurality of separate number ranges,
   b12. determining which particular number range of the plurality of separate number ranges includes the estimated average number of cells stored in the memory, and
   b13. assigning the allocated discard weight of the particular number range to the cell.

5. The method in accordance with claim 4 wherein the discard weight for each of said plurality of number ranges is allocated at step b11 as an increasing function of magnitude of number values spanned by the number range.

6. The method in accordance with claim 1 wherein step b comprises the step of:
   b1. making the determination with respect to a first cell of the cell sequence as to whether to discard that first cell and all other cells of the cell sequence based on a comparison of the first cell's assigned discard weight and the random number, and on whether a current number of cells stored in the cell memory at the time the determination is made exceeds a predetermined threshold level; and b2. one of discarding all cells of the cell sequence or storing all cells of the sequence in the memory in accordance with the determination made at step b1.

7. The method in accordance with claim 1 wherein the step d of repetitively generating an estimate of an average number of cells stored in the memory during a period immediately preceding generation of the estimate comprises the substeps of:

a1. multiplying a last computed average number of cells stored in the memory by a value of a parameter X between 0 and 1 to produce a first value, a2. multiplying a number of cells currently stored in the memory by a quantity (1−X) to produce a second value, and a3. generating a next estimate of the average number of cells stored in the memory, as a sum of the first and second value, and a4. iteratively repeating steps a1 through a3.

8. The method in accordance with claim 1 wherein step b comprises the substeps of:

b1. allocating a separate discard weight for each of a plurality of separate number ranges;

b2. determining which particular number range of the plurality of separate number ranges includes the estimated average number of cells stored in the memory;

b3. assigning the allocated discard weight of the particular number range to a first cell of each sequence, b4. generating a random number;

b5. comparing said at least one cell's assigned discard weight to the random number to produce result data indicting whether the discard weight exceeds a value of the random number;

b6. making the determination with respect to the first cell of the cell sequence as to whether to discard that first cell and all other cells of the cell sequence based on a comparison of the first cell's assigned discard weight and the random number; and b7. one of discarding all cells of the cell sequence or storing all cells of the sequence in the memory in accordance with the determination made at step b6.

9. The method in accordance with claim 8 wherein the step d of repetitively generating art estimate of an average number of cells stored in the memory during a period immediately preceding generation of the estimate comprises the substeps of:

a1. multiplying a last computed average number of cells scored in the memory by a value of a parameter X between 0 and 1 to produce a first value, a2. multiplying a number of cells currently stored in the memory by a quantity (1−X) to produce a second value, and a3. generating a next estimate of the average number of cells stored in the memory, as a sum of the first and second value, and a4. iteratively repeating steps a1 through a3.

10. The method in accordance with claim 1 wherein the estimated of the average number of cells stored in the memory is estimated at step d whenever there is a change in a number of cells currently stored in the memory.

11. An apparatus for receiving, storing and then forwarding data in a plurality of incoming packets that vary in size, the apparatus comprising:

a memory;

first means for receiving each incoming packet and for generating a cell sequence corresponding to the incoming packet, wherein each cell of the cell sequence packet contains a separate portion of the data included in the incoming packet, and wherein each cell of each generated cell sequence is of a uniform size;

second means for making a determination with respect to at least one cell of each generated cell sequence to whether to discard the cell or to store the cell in the memory;

third means for one of storing or discarding the cell in the memory in accordance with the determination made by the second means, and for reading cells out of the memory and forwarding the cell; and fourth means for repetitively generating an estimate of an average number of cells stored in the memory during a period immediately preceding generation of the estimate, wherein the determination made by the second means is a function of the generated estimate.

12. The apparatus in accordance with claim 11 wherein the second means comprises:

fifth means for assigning each cell a discard weight that is a function of the estimate generated by the fourth means;

sixth means generating a random number;

seventh means for comparing the cell's assigned discard weight to the random number to produce result data indicting whether the discard weight exceeds a value of the random number, eighth means for making the determination as to whether to discard the cell or to store the cell in the memory in response to the result data.

13. The apparatus in accordance with claim 12 wherein the discard weight assigned to each cell is a variable function of the estimated average number.

14. The apparatus in accordance with claim 12 wherein the fifth means allocates a separate discard weight for each of a plurality of separate number ranges, determines which particular number range of the plurality of separate number ranges includes the estimated average number of cells stored in the memory, and assigns the allocated discard weight of the particular number range to the cell.

15. The apparatus in accordance with claim 14 wherein the fifth means allocates the discard weight for each of the plurality of number ranges as an increasing function of magnitude of number values spanned by the number range.

16. The apparatus in accordance with claim 12 wherein the eighth means makes making a determination with respect to a first cell of each cell sequence as to whether to discard that first cell and all other cells of the cell sequence based on a comparison of the first cell's assigned discard weight and the random number, and on whether a current number of cells stored in the cell memory at the time the determination is made exceeds a predetermined threshold level.

17. The apparatus in accordance with claim 11 wherein the fourth means comprises:

means for multiplying a previously generated estimate of an average number of cells stored in the memory by a value of a parameter X between 0 and 1 to produce a first value, means for multiplying a number of cells currently stored in the memory by a quantity (1−X) to produce a second value, and means for generating a next estimate of the average number of cells stored in the memory, as a sum of the first and second value.

18. The apparatus in accordance with claim 11 wherein the second means comprises:

fifth means for allocating a separate discard weight for each of a plurality of separate number ranges;

sixth means for determining which particular number range of the plurality of separate number ranges includes the estimated average number of cells stored in the memory;

seventh means for assigning the allocated discard weight of the particular number range to a first cell of each sequence;

eighth means for generating a random number;

ninth means for comparing said at least one cell's assigned discard weight to the random number to produce result data indicting whether the discard weight exceeds a value of the random number; and tenth means for making the determination with respect to the first cell of the cell sequence as to whether to discard that first cell and all other cells of the cell sequence based on a comparison of the first cell's assigned discard weight and the random number, and wherein the third means one of discards all cells of the cell sequence or stores all cells of the sequence in the memory in accordance with the determination wade by the tenth means.

* * * * *